US009201596B2

(12) United States Patent
Xiong et al.

(10) Patent No.: US 9,201,596 B2
(45) Date of Patent: *Dec. 1, 2015

(54) TRANSMITTING DATA BY MEANS OF STORAGE AREA NETWORK

(71) Applicant: International Business Machines Corporation, Armonk, NY (US)

(72) Inventors: Yin Xiang Xiong, Beijing (CN); Jing Wen, Beijing (CN); Yan Xin Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/597,346

(22) Filed: Jan. 15, 2015

(65) Prior Publication Data

US 2015/0134906 A1    May 14, 2015

Related U.S. Application Data

(63) Continuation of application No. 13/453,298, filed on Apr. 23, 2012, now Pat. No. 8,996,645.

(30) Foreign Application Priority Data

Apr. 29, 2011    (CN) .......................... 2011 1 0111381

(51) Int. Cl.
*G06F 3/06*    (2006.01)
*H04L 29/08*    (2006.01)

(52) U.S. Cl.
CPC .............. *G06F 3/0608* (2013.01); *G06F 3/067* (2013.01); *G06F 3/0665* (2013.01); *G06F 3/0689* (2013.01); *H04L 67/1097* (2013.01)

(58) Field of Classification Search
CPC ..... H04L 67/1097; H04L 67/22; H04L 67/02; H04L 67/10; H04L 67/306; H04L 67/38; H04L 51/046; H04L 12/1822; H04L 12/1859; H04L 12/4633; H04L 12/4641; H04L 12/58; H04L 41/042; H04L 41/0806; H04L 41/0816; H04L 41/0826; H04L 41/0893; H04L 41/24; H04L 41/5009; H04L 43/0864; H04L 47/70; H04L 49/357; H04L 51/32; H04L 63/0421; H04L 63/083; H04L 63/0853; H04L 63/14; H04L 67/00; H04L 67/1002; H04L 67/1004; H04L 67/1008; H04L 67/101; H04L 67/1021; H04L 67/104; H04L 67/1095; H04L 67/20; H04L 67/26; H04L 67/36; H04L 67/42
USPC ......... 709/213, 214, 215, 203, 204, 206, 219, 709/224, 226; 711/109, 133, 136
See application file for complete search history.

(56) References Cited

U.S. PATENT DOCUMENTS 6,385,706 B1    5/2002 Ofek et al.
6,826,666 B2    11/2004 Berkowitz et al.
(Continued)

FOREIGN PATENT DOCUMENTS

WO    WO03040946 A1    5/2003

OTHER PUBLICATIONS

Bancroft et al., "Functionality and Performance Evaluation of File Systems for Storage Area Networks (SAN)", Proceedings of the Eighth Goddard Conference on Mass Storage Systems, Mar. 2000, pp. 41-59.
(Continued)

*Primary Examiner* — Douglas Blair
*Assistant Examiner* — Linh T. Nguyen
(74) *Attorney, Agent, or Firm* — Yee & Associates, P.C.; Joseph Petrokaitis

(57) ABSTRACT

In the technical field of data storage and access, the invention relates to the technique of data transmission using a storage area network (SAN) in a magnetic disk storage device environment, including a method for transmitting data over a SAN in such an environment, including: determining a logical volume accessible to a server of the magnetic disk storage device; obtaining information on a logical volume accessible to a client of the magnetic disk storage device, which is determined by the client; establishing a corresponding relationship between the logical volume accessible to the server and the logical volume accessible to the client; receiving a request for using the logical volume of the magnetic disk storage device from the client; and informing the client of an available logical volume by utilizing the corresponding relationship so that a data access to the available logical volume is performed by the client over the SAN.

10 Claims, 7 Drawing Sheets

(56) References Cited

U.S. PATENT DOCUMENTS

| | | |
|---|---|---|
| 6,839,746 B1 | 1/2005 | Muthiyan et al. |
| 6,950,871 B1 | 9/2005 | Honma et al. |
| 7,120,654 B2 | 10/2006 | Bromley |
| 7,633,955 B1 | 12/2009 | Saraiya et al. |
| 7,783,779 B1 * | 8/2010 | Scales et al. ............. 709/240 |
| 7,899,885 B2 | 3/2011 | Aultman et al. |
| 7,917,712 B2 | 3/2011 | Collins et al. |
| 7,962,706 B2 | 6/2011 | Davis |
| 8,086,799 B2 | 12/2011 | Mondal et al. |
| 8,200,801 B2 | 6/2012 | Scheid |
| 8,255,659 B1 * | 8/2012 | Pattar ........................ 711/170 |
| 2002/0099914 A1 * | 7/2002 | Matsunami et al. ......... 711/154 |
| 2004/0002934 A1 | 1/2004 | Taulbee et al. |
| 2004/0039756 A1 | 2/2004 | Bromley |
| 2004/0128456 A1 | 7/2004 | Kobayashi et al. |
| 2007/0079091 A1 | 4/2007 | Collins et al. |
| 2007/0288446 A1 | 12/2007 | Frieder et al. |
| 2008/0162960 A1 | 7/2008 | Higaki et al. |
| 2009/0210640 A1 | 8/2009 | Davis |
| 2010/0017496 A1 | 1/2010 | Kimmel et al. |
| 2010/0042790 A1 | 2/2010 | Mondal et al. |
| 2010/0088296 A1 | 4/2010 | Periyagaram et al. |
| 2010/0106933 A1 | 4/2010 | Kamila et al. |
| 2010/0199053 A1 | 8/2010 | Otani et al. |
| 2011/0047342 A1 | 2/2011 | Scheid |
| 2011/0295815 A1 * | 12/2011 | Mandagere et al. ......... 707/690 |
| 2012/0278423 A1 | 11/2012 | Xiong et al. |
| 2012/0331088 A1 | 12/2012 | O'Hare et al. |
| 2013/0007364 A1 | 1/2013 | Xiong et al. |

OTHER PUBLICATIONS

Hong et al., "Duplicate Data Elimination in a SAN File System", Proceedings of the 21st IEEE/12th NASA Goddard Conference on Mass Storage Systems and Technology, Apr. 2004, pp. 301-314.

Office Action, dated Oct. 15, 2013, regarding U.S. Appl. No. 13/453,298, 28 pages.

Final Office Action, dated Mar. 7, 2014, regarding U.S. Appl. No. 13/453,298, 24 pages.

Notice of Allowance, dated Nov. 21, 2014, regarding U.S. Appl. No. 13/453,298, 19 pages.

Office Action, dated Oct. 24, 2013, regarding U.S. Appl. No. 13/616,824, 18 pages.

Final Office Action, dated Mar. 7, 2014, regarding U.S. Appl. No. 13/616,824, 24 pages.

* cited by examiner

| Logical Volume | Unique Identifier WWN | Device Description File of Sever | Device Description File of Client 1 | Device Description File of Client 2 |
|---|---|---|---|---|
| Vol1 | WWN1 | des_file1 | des_file4 | des_file6 |
| Vol2 | WWN2 | des_file2 | None | des_file7 |
| Vol3 | WWN3 | des_file3 | des_file5 | None |

| Logical Volume | Unique Identifier | Device Description File |
|---|---|---|
| Vol1 | WWN1 | des_file4 |
| Vol3 | WWN3 | des_file5 |

Figure 4C

| Logical Volume | Unique Identifier | Device Description File |
|---|---|---|
| Vol1 | WWN1 | des_file6 |
| Vol2 | WWN2 | des_file7 |

Figure 4D

TRANSMITTING DATA BY MEANS OF STORAGE AREA NETWORK

CROSS-REFERENCE TO RELATED APPLICATIONS

This application is a continuation of and claims the benefit of priority to U.S. patent application Ser. No. 13/453,298, filed on Apr. 23, 2012, which claims the benefit of priority to Chinese Patent Application No. 201110111381.7 filed on Apr. 29, 2011, the contents of which are herein incorporated by reference.

TECHNICAL FIELD

The invention relates to the technical field of data transmission in a magnetic disk storage device environment. Particularly, the invention relates to a data transmission technique using a storage area network (SAN) in a magnetic disk storage device environment.

BACKGROUND ART

Because of an increasing demand for a storage capacity and a data access rate of a magnetic disk storage device, the data access using a local area network (LAN) in a magnetic disk storage device environment is challenged in many aspects, including a limited network bandwidth, an access to massive data, etc. A technology of a LAN-free data access, i.e. a data access over a SAN, is widely popular.

The SAN is an optical fiber network, which is used in broad scope due to features of a fast data transmission rate, saving network resources in the LAN, etc. However, one main problem of the SAN is that although its internal data transmission rate is high, the SAN can not accomplish a file share in a heterogeneous environment. In the case that a plurality of entities require a shared access to same data in the SAN (typically, for example, in an application environment of a server-client mode, a server and a client need a shared access to data), the SAN can only be applied to a magnetic tape storage device environment, rather than a magnetic disk storage device environment, for which the reason is that a large number of logic volumes are independent devices for a storage server and a client in the magnetic disk storage device environment, and a device description file of a logic volume identified by the server is different from a device description file of the same one identified by the client. However, since a magnetic tape belongs to a sequential storage medium, its access efficiency is low. Sometimes, it will take a long time to find a file in sequence. Therefore, there is a need for a technical solution that a data transmission is implemented between a user and a storage device using the SAN in the magnetic disk storage environment. For example, such a typical demand is that when an operation of a data de-duplication is performed, it is necessary to divide a file into small file blocks, and the small file blocks may be dispersed on different volumes. That is, in order to obtain one file, it is possibly required to access a plurality of volumes to get a plurality of small file blocks dispersed on the plurality of volumes, which is easily achieved in the magnetic disk storage environment, but in the magnetic tape storage environment, it is required to search the small file blocks on a plurality of magnetic tapes in sequence, consuming a long time and a lot of magnetic tape hardware resources. If an operation of a data de-duplication is performed in the magnetic disk storage environment connected by the SAN, a working efficiency can be greatly improved.

In the prior art, there exists the following two technical solutions solving the above problem. One solution is to first let a user access data on a magnetic tape storage device over the SAN, and then migrate the data in the magnetic tape storage device to a magnetic disk storage device. In fact, the method is equivalent to using a magnetic tape device as a temporary storage medium with a defect that a large number of hardware consumptions are caused and additional data migration time to migrate the data on the magnetic tape to the magnetic disk is required. The other solution is to utilize a distributed file system (e.g. a GPFS) so that both a server and a user can access data on the magnetic disk over the SAN. However, such solution has a defect that the distributed file system costs are very expensive, and even far more expensive than the magnetic disk storage device itself. Thus, many medium and small-sized enterprise users would not like to choose the distributed file system.

SUMMARY OF THE INVENTION

Considering the above existing problem, an object of the present invention is to provide a method or system for performing a data access/transmission over a storage area network (SAN) in a magnetic disk storage environment. Another object of the present invention is to provide a method or system capable of performing a data access/transmission over a storage area network (SAN) in a magnetic disk storage environment without extra update or supplement of a hardware device.

According to one aspect of the present invention, a method for transmitting data over a storage area network (SAN) in a magnetic disk storage device environment is provided, comprising: determining a logical volume accessible to a server of said magnetic disk storage device; obtaining information on a logical volume accessible to a client of said magnetic disk storage device, which is determined by said client; establishing a corresponding relationship between said logical volume accessible to the server and said logical volume accessible to the client; and transmitting to said client a notification on to which logical volume data are transmitted by said client over the SAN by utilizing said corresponding relationship so that a data access to said available logical volume is performed by said client over the SAN.

According to another aspect of the present invention, a system for transmitting data over a storage area network (SAN) in a magnetic disk storage device environment is provided, comprising: a determining apparatus for determining a logical volume accessible to a server of said magnetic disk storage device; an obtaining apparatus for obtaining information on a logical volume accessible to a client of said magnetic disk storage device, which is determined by said client; a corresponding relationship establishing apparatus for establishing a corresponding relationship between said logical volume accessible to the server and said logical volume accessible to the client; a receiving apparatus for receiving a request for using a logical volume of said magnetic disk storage device from the client; and a notifying apparatus for informing said client of an available logical volume by utilizing said corresponding relationship so that a data accesses to the available volume is performed by said client over the SAN.

With the method and system of the present invention, an object can be achieved that data are transmitted by using a storage area network (SAN) in a pure magnetic disk storage medium environment, saving network resources of a local area network (LAN), and improving a data transmission rate without an assistance of a magnetic tape as a temporal storage medium and without any other hardware device added, such as a distributed file system.

BRIEF DESCRIPTION OF THE DRAWINGS

The above and other features of the present invention will be more apparent through the detailed description of embodiments shown in conjunction with appended drawings. Same reference numerals denote same or similar elements in the appended drawings of the present invention:

FIG. 4C shows a corresponding relationship table established at a first client according to an embodiment of the present invention;

FIG. 4D shows a corresponding relationship table established at a second client according to an embodiment of the present invention;

DETAILED DESCRIPTION OF THE PREFERRED EMBODIMENTS

Figure 1:
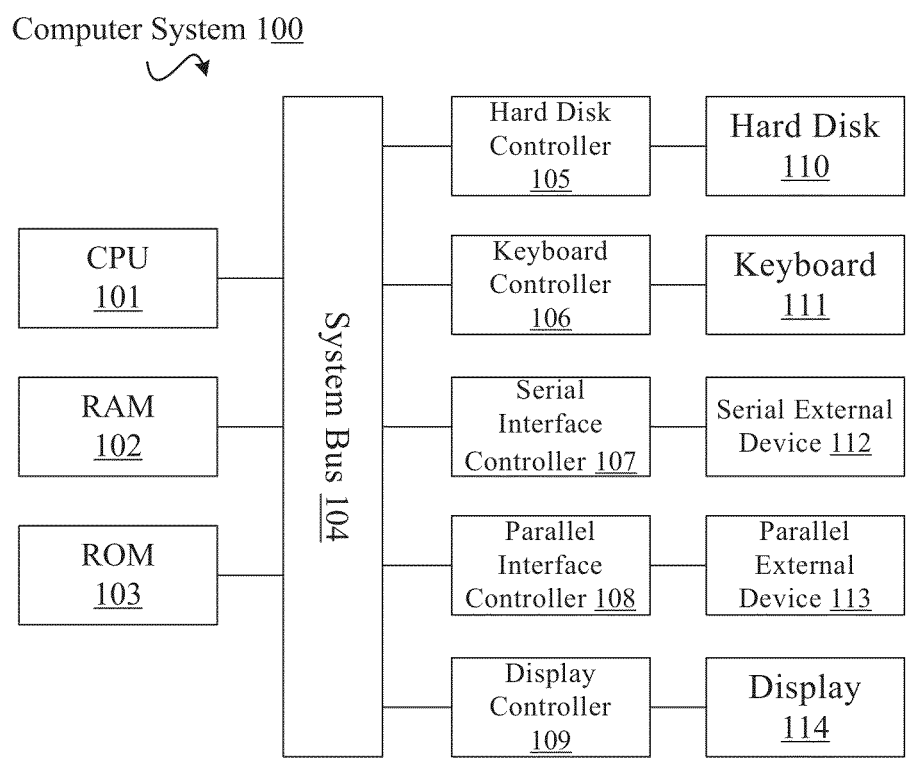
FIG. 1 shows a block diagram of an exemplary computer system 100 adapted to accomplish an embodiment of the present invention.

Hereinafter, a method and system proposed in the present invention for transmitting data over a storage area network (SAN) in a magnetic disk storage device environment will be described in detail through embodiments with reference to the appended drawings.

Those skilled in the art should understand that a plurality of aspects of the present invention may be embodied as a system, a method or a computer program product. Therefore, the plurality of aspects of the present invention can be embodied as following forms, that is, an absolute hardware, an absolute software (comprising a firmware, a resident software, a microcode, etc.), or a combination of a software part and a hardware part referred to as a "circuit", a "module" or a "system" in this document. Further, the plurality of aspects of the present invention can also adopt a form of computer program product embodied in one or more computer readable medium(s) including computer useable program codes.

Any combination of one or more computer readable medium(s) can be used. The computer readable medium can be a computer readable signal medium or a computer readable storage medium. For example, the computer readable storage medium can be, but not limit to, an electric, magnetic, optical, electromagnetic, infrared or semi-conductive system, apparatus, device or any combination thereof. More specific examples (a non-exhaustive list) of the computer readable storage medium include the following: an electrical connection with one or more wires, a portable computer disk, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any appropriate combination thereof. In the context of this document, the computer readable storage medium can be any tangible medium containing or storing a program for use by or in connection with an instruction executing system, apparatus or device.

The computer readable signal medium may include a data signal propagated in a base band or as part of a carrier wave, which embodies the propagation of computer readable program codes. The propagated signal can adopt a plurality of forms including, but not limiting to, an electromagnetic signal, an optical signal or any appropriate combination thereof. The computer readable signal medium can be not only a computer readable storage medium, but any computer readable medium which is capable of transmitting, propagating or transporting the program for use by or in connection with an instruction executing system, apparatus or device. The program codes contained on the computer readable medium can be transmitted with any appropriate medium including, but not limiting to, a wireless, a wire, an optical fiber cable, a RF or the like, or any appropriate combination thereof.

The program codes contained on the computer readable medium can be transmitted with any appropriate medium including, but not limiting to, a wireless, a wire, an optical fiber cable, a RF or the like, or any appropriate combination thereof.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on a user's computer, as a stand-alone software package, partly on a user's computer and partly on a remote computer or entirely on a remote computer or server. In the latter scenario, the remote computer may be connected to the user's computer through any type of network, including a local area network (LAN), or a wide area network (WAN), or the connection may be made to an external computer (for example, through the Internet using an Internet Service Provider).

The plurality of aspects of the present invention is described below with reference to the flowcharts and/or block diagrams of the method, apparatus (system) and computer program product according to the embodiments of the present invention. It is understood that each block of the flowcharts and/or block diagrams and combinations of blocks in the flowcharts and/or block diagrams, can be both implemented by computer program instructions. These computer program instructions may be provided to a processor of a general purpose computer, special purpose computer, or other programmable data processing apparatus, thereby producing a machine, such that the instructions, which execute by the computer or the other programmable data processing apparatus, create means for implementing the functions/operations specified in the block or blocks in the flowcharts and/or block diagrams.

These computer program instructions may also be stored in a computer-readable medium that can direct a computer or other programmable data processing apparatus to function in a particular manner, such that the instructions stored in the computer-readable medium produce an article of manufacture including instruction means implementing the functions/operations specified in the block or blocks in the flowcharts and/or block diagrams.

The computer program instructions may also be loaded onto a computer or other programmable data processing apparatus to cause a series of operation steps to be performed on the computer or other programmable data processing apparatus to generate a computer implemented process such that the instructions which execute on the computer or other programmable data processing apparatus provide processes for implementing the functions/operations specified in the block or blocks in the flowcharts and/or block diagrams.

FIG. 1 shows a block diagram of an exemplary computer system 100 adapted to accomplish an embodiment of the present invention. As shown, the computer system 100 may include: a CPU (central processing unit) 101, a RAM (random access memory) 102, a ROM (read-only memory) 103, a system bus 104, a hard disk controller 105, a keyboard controller 106, a serial interface controller 107, a parallel interface controller 108, a display controller 109, a hard disk 110, a keyboard 111, a serial external device 112, a parallel external device 113, and a display 114. In these devices, the CPU 101, the RAM 102, the ROM 103, the hard disk controller 105, the keyboard controller 106, the serial interface controller 107, the parallel interface controller 108 and the display controller 109 are coupled with the system bus 104. The hard disk 110 is coupled to the hard disk controller 105, the keyboard 111 is coupled to the keyboard controller 106, the serial external device 112 is coupled to the serial interface controller 107, the parallel external device 113 is coupled to the parallel interface controller 108, and the display 114 is coupled to the display controller 109. It should be understood that the structure block diagram shown in FIG. 1 is illustrated only for purpose of an example, and is not to limit the scope of the present invention. In some cases, some devices can be added or deleted according to specific condition.

Figure 2:
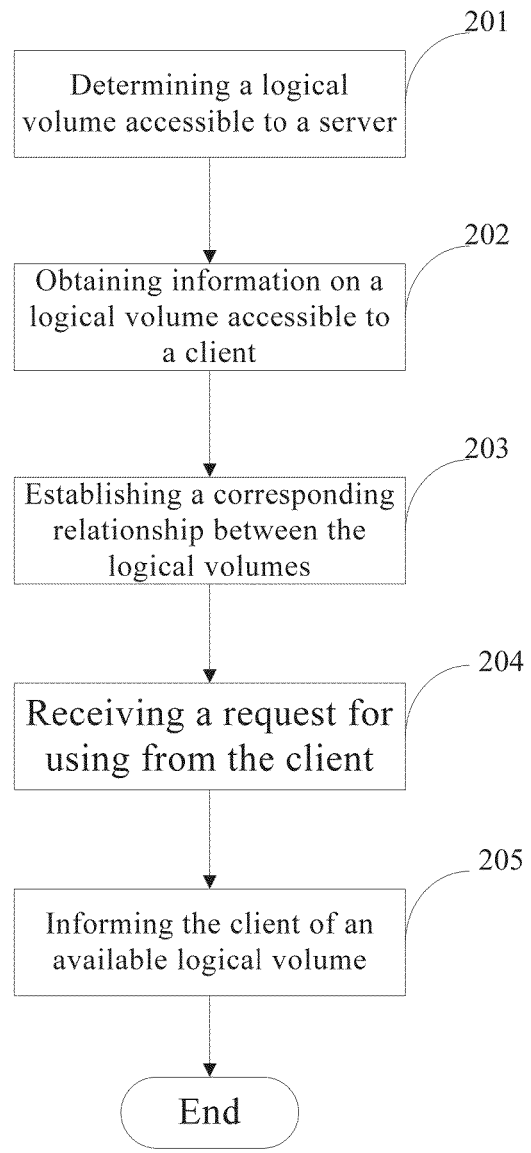
FIG. 2 shows a flowchart of a method for transmitting data over a storage area network (SAN) in a magnetic disk storage device environment according to an embodiment of the present invention.

FIG. 2 shows a flowchart of a method for transmitting data over a storage area network (SAN) in a magnetic disk storage device environment according to an embodiment of the present invention.

The method shown in FIG. 2 begins with step 201. At step 201, a logical volume accessible to a server of the magnetic disk storage device is determined. For a storage system, a server and a client need shared access to stored files/data, and the server and the client may only have a permission to access some logical volumes of the magnetic disk. Usually, the logical volume which the client has the permission to access belongs to a subset of the logical volume which the server has the permission to access. According to an embodiment of the present invention, the logical volume accessible to the server of the magnetic disk storage device can be determined by scanning a host bus adapter (HBA). Such scanning can be automatically performed upon an initialization of the storage system. According to an embodiment of the present invention, determining the logical volume accessible to the server of the magnetic disk storage device includes determining a first set of device description file of the logical volume accessible to the server of the magnetic disk storage device and a unique identifier WWN (world wide name) of the logical volume accessible to the server. It need be pointed out that the device description file can be understood as a map of the devices (i.e. the logical volumes of the magnetic disk storage medium), rather than an actually existing file. For the server, each logical volume accessible to it has a device description file. However, for one logical volume, the device description file mapping the logical volume to the server is different from the device description file mapping the same to the client. Whereas, each logical volume has a unique identifier (WWN), and the identifier is the same no matter for the server or the client.

Next, it proceeds to step 202. At step 202, information is obtained on a logical volume accessible to the client, which is determined by the client of the magnetic disk storage device. Similarly to the server, the client can determine the logical volume accessible to the client of the magnetic disk storage device through scanning a host bus adapter (HBA), and transmit a determined result to the server. According to an embodiment of the present invention, the obtained information on the logical volume accessible to the client includes: a second set of device description file of the logical volume accessible to the client of the magnetic disk storage device and a unique identifier WWN of the logical volume accessible to the client. After such a determination, each client can create and maintain a corresponding relationship table between the WWN and the second set of device description file. Of course, those skilled in the art should understand that it is not a step necessary for the present invention that the client creates and maintains such a corresponding relationship table. See FIG. 4C or 4D for an example of such a corresponding relationship table.

Then at step 203, a corresponding relationship between the logical volume accessible to the client and the logical volume accessible to the server is established. The reason for establishing such corresponding relationship is that for a same logical volume, it may be identified as different device description files by the server and the client, so that a uniformity can not be achieved between the client and the server if the logical volume of the magnetic disk storage medium is accessed over the storage area network (SAN). For instance, the first device description file of a certain logical volume is abc with respect to the server, while the second device description file of the logical volume is bcd with respect to the client. If the client is intending to transmit data with the logical volume, the client will inform the server that it needs to communicate with the logical volume having the device description file of bcd. However, the server does not have information on the logical volume having the device description file of bcd, or has the information on the logical volume having the device description file of bcd but it is actually not the logical volume to which the client desires to transmit data, which renders that the data transmission can not be implemented correctly. According to an embodiment of the present invention, establishing the corresponding relationship between the logical volume accessible to the server and the logical volume accessible to the client comprises establishing a corresponding relationship between different device description files having the same WWN identifier and belonging to the first set of description file and the second set of description file respectively. Since the logical volume accessible to the server and the information on the logical volume accessible to the client have already been obtained at steps 201 and 202, the obtained information can be used to establish the corresponding relationship between the two sets of logical volumes. The aim of establishing the corresponding relationship is to make the different device description files mapped with each other between the server and the client, thereby overcoming the defect that the logical volume as an operation object can not be correctly identified due to directly applying the storage area network (SAN) into the magnetic disk storage device environment currently. The established corresponding relationship will be explained in FIG. 4B and corresponding texts.

Next, the method shown in FIG. 2 proceeds to step 204. At step 204, a request of the client for using the logical volume of the magnetic disk storage device is received. According to an embodiment of the present invention, the request is a request that the client reads data from the logical volume of the magnetic disk storage device. According to another embodiment of the present invention, the request is a request that the client writes data into the logical volume of said magnetic disk storage device. According to an embodiment of the present invention, the received request is a request which does not designate a particular logical volume, e.g. the client requests for saving a file in the magnetic disk storage medium, but does not specifically designate on which logical volume or volumes the file is saved. According to another embodiment of the present invention, the received request is a request which designates a particular logical volume, e.g. the client requests for reading a file from the magnetic disk storage medium, which already exists on a certain logical volume or volumes definitely.

At step 205, the client is informed of an available logical volume by utilizing the corresponding relationship, and the available logical volume is data-accessed by the client over the SAN. Since at step 203 the corresponding relationship has been established between the first set of device description file and the second set of device description file, at step 205 the logical volume available for the client can be identified and the client is notified. According to an embodiment of the present invention, if the request of the client is a request which does not designate a particular logical volume, then informing the client of the available logical volume comprises informing the client of the particular logical volume information. According to another embodiment of the present invention, if the request of the client designates a particular logical volume, then informing the client of the available logical volume comprises returning successful or error confirmation information to the client. Subsequently, the client can perform a data access to these available logical volumes over the storage area network (SAN).

According to an embodiment of the present invention, in the method shown in FIG. 2, a communication is performed between the client and the server over a local area network (LAN). For example, over the local area network (LAN) the client is informed of the available logical volume, the information on the logical volume accessible to the client which is determined by the client of the magnetic disk storage device is obtained over the LAN, and the request for the client using the logical volume of the magnetic disk storage device is received over the LAN.

Those skilled in the art should understand that the terms of "client", "server end" or "server" in the foregoing and context are not the server and end user in common sense. Actually, the "client" in this document indicates a user server or a proxy server in a storage system, which may be coupled to a plurality of end users; and the "server end" or "server" in this document indicates a storage system server for managing a request of the "client" in the storage system.

Those skilled in art should also understand that steps 201 and 202 in the method shown in FIG. 2 can be performed automatically upon restarting the storage system or can be performed periodically according to a setting of the storage system, or can be performed at any time manually set by a system administrator to scan the host bus adapter (HBA) to obtain related information.

Through the method shown in FIG. 2, an object can be achieved that in the case that a plurality of entities (such as a server and a client) need to share data, data are transmitted over a storage area network (SAN) based on a pure magnetic disk storage medium environment, saving network resources of a local area network (LAN), and improving a data transmission rate without an assistance of a magnetic tape as a temporal storage medium and without any other hardware device added, such as a distributed file system.

Figure 3:
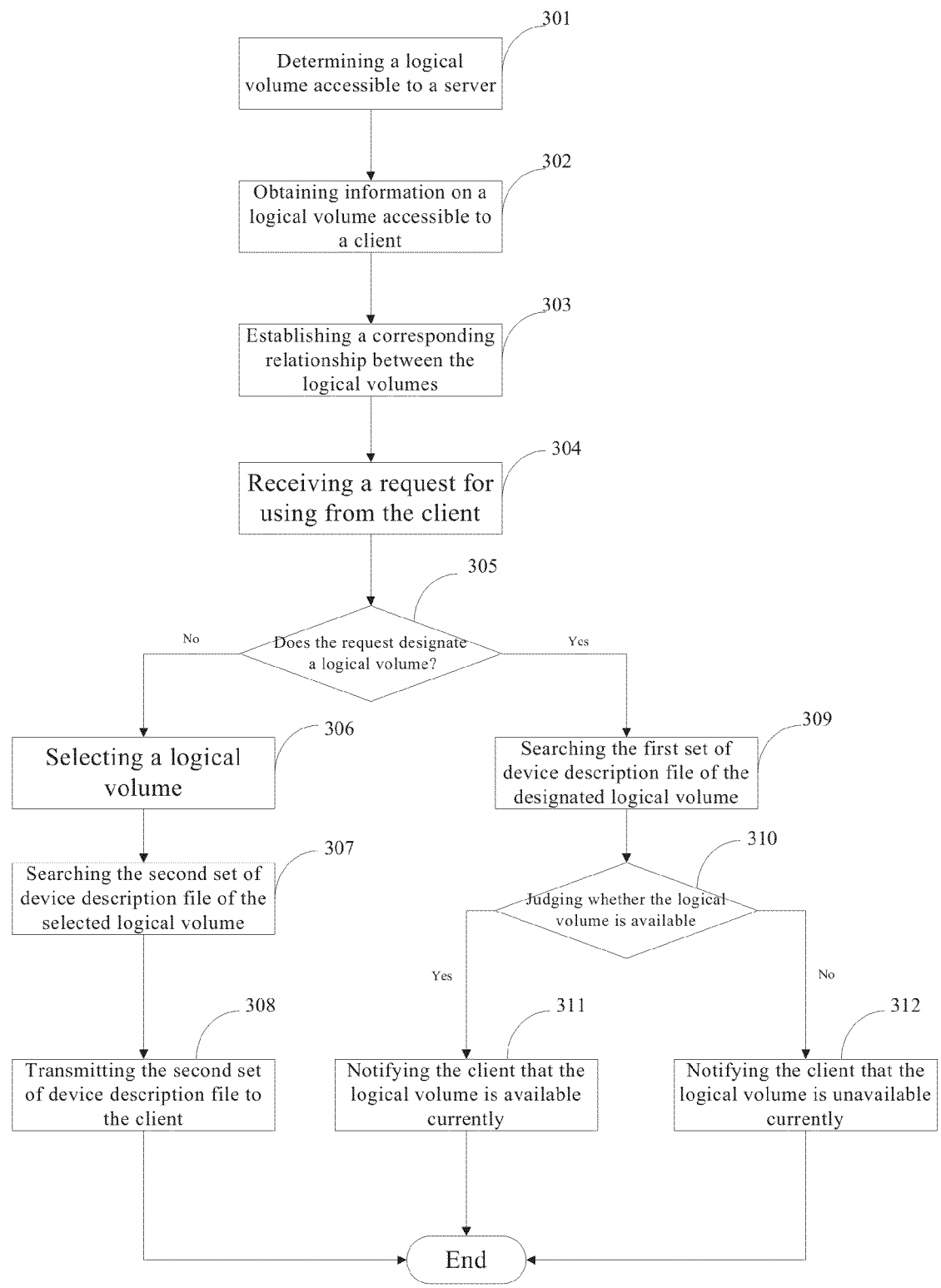
FIG. 3 shows a flowchart of a method for transmitting data over a storage area network (SAN) in a magnetic disk storage device environment according to another embodiment of the present invention.

FIG. 3 shows a flowchart of a method for transmitting data over a storage area network (SAN) in a magnetic disk storage device environment according to another embodiment of the present invention.

Steps 301-304 of the method shown in FIG. 3 correspond to steps 201-204 of the method shown in FIG. 2, respectively. Herein, they will be not described redundantly.

Steps 305-312 in FIG. 3 can be understood as corresponding to step 205 in FIG. 2. At step 305, it is judged whether the request of the client received in step 304 designates a particular logical volume. If the judging result at step 305 is no, then it proceeds to step 306.

At step 306, since the request of the client does not designate a particular logical volume, a logical volume available for the client is selected from the logical volume accessible to the server. Because the logical volume accessible to the server may be not necessarily available for the client at special time and in special condition, it is necessary to select a logical volume available for the client to ensure an operation of data access is performed successfully. According to an embodiment of the present invention, selecting a logical volume available for the client from the logical volume accessible to the server includes: randomly selecting a logical volume from the logical volume accessible to the server; judging whether the client has a permission to access the randomly selected logical volume; judging whether the logical volume which the client has the permission to access is currently available if the judging result is yes; and determining the logical volume which the client has the permission to access and which is currently available as the logical volume accessible to the client if the judging result is yes. According to another embodiment of the present invention, judging whether the client has a permission to access the randomly selected logical volume is accomplished by the corresponding relationship established at step 303. Furthermore, the reason why whether the logical volume is currently available is still judged after judging whether the client has a permission to access the logical volume is that there are possible factors that the logical volume is already out of order, or the network card for accessing the logical volume does not work, and the like. Those skilled in the art should understand that the above two judging procedures and the step of first randomly selecting a logical volume are not necessary steps for the present invention, and are not specifically shown in the method of FIG. 3. No matter what means is adopted, as long as the logical volume available for the client is selected at step 306, it falls into the protection scope of the present invention.

Next, at step 307, the corresponding relationship established at step 303 is utilized to search the second set of device description file corresponding to the first set of device description file of the selected logical volume. And at step 308, the found second set of device description file of the selected logical volume is transmitted to the client providing the request. Then, the client can perform a data transmission operation with the logical volume corresponding to the second set of device description file according to the received second set of device description file.

According to another embodiment of the present invention, at step 307, the corresponding relationship established at step 303 is utilized to search a unique identifier WWN corresponding to the first set of device description file of the selected logical volume. And at step 308, the found unique identifier WWN is transmitted to the client providing the request. After that, the client finds the second set of device description file corresponding to the unique identifier WWN according to its own corresponding relationship table between the device description file and the WWN. In the embodiment, the client is required to create and maintain its own corresponding relationship table between the second set of device description file and the unique identifier (WWN), whereas in the embodiment of steps 307 and 308 illustrated in FIG. 3, the client is not required to create a corresponding relationship table between the second set of device description file and the WWN by itself since the second set of device description file is directly transmitted to the client.

Returning to step 305, if the judging result is yes, that is to say the request of the client designates the logical volume required for a data transmission, then it proceeds to step 309.

At step 309, the corresponding relationship is utilized to search the first set of device description file corresponding to the second set of device description file of the designated logical volume, and at step 310 it is judged whether the logical volume indicated by the found first set of device description file is currently available. It is emphasized that the reason why the first set of device description file is searched according to the second set of device description file at step 309 while the second set of device description file is searched according to the first set of device description file at step 307 is that a branch of steps 309-312 is based on the condition that the client designates the logical volume to be operated thereby. When the client transmits the information on the logical volume designated thereby to the server, what is sent is the second set of device description file of the designated logical volume with respect to the client.

Next, if the judging result is yes at step 310, then it proceeds to step 311 at which the client is notified that the designated logical volume is currently available. Afterward, the client can transmit data with the designated logical volume over the storage area network (SAN). According to an embodiment of the present invention, the client is informed that the designated logical volume is currently available by returning successful or confirmation information.

If the judging result is no at step 310, then it proceeds to step 312 at which the client is notified that the designated logical volume is currently unavailable. According to an embodiment of the present invention, the reason for the unavailable logical volume may be the designated logical volume has already been out of order currently. According to another embodiment of the present invention, the reason for the unavailable logical volume may be the client has no permission to access the designated logical volume. According to an embodiment of the present invention, the client is notified that the designated logical volume is currently unavailable by returning error information.

Next, in conjunction with a specific example of FIGS. 4A-4D, the technical solution according to an embodiment of the present invention is described in order to more intuitively understand the technical concept of the present invention.

Figures 4A, 4B:
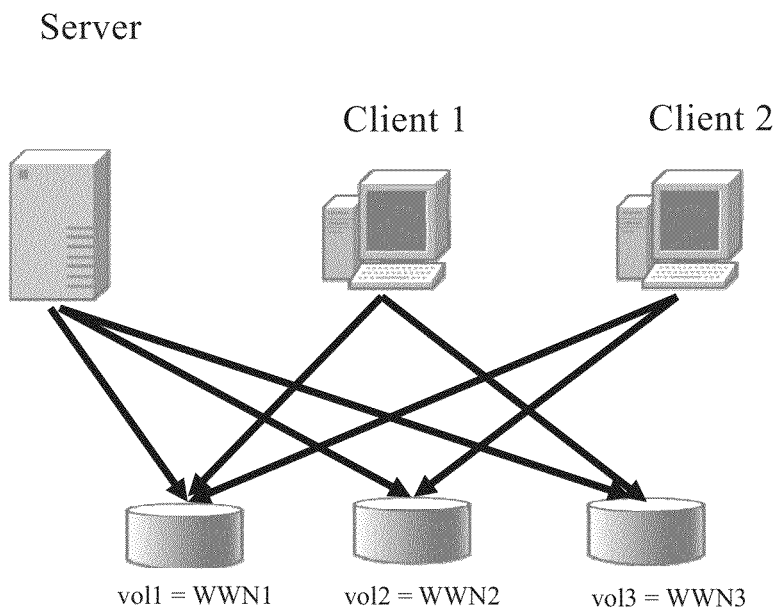
FIG. 4A shows an architecture diagram of a magnetic disk storage system according to an embodiment of the present invention.
FIG. 4B shows a corresponding relationship table established at a server according to an embodiment of the present invention.

FIG. 4A shows an architecture diagram of a magnetic disk storage system according to an embodiment of the present invention. The system shown in FIG. 4A includes two clients (client 1 and client 2). Those skilled in the art should understand that the number of the clients may be one or more. The black thick solid line in FIG. 4A represents the logical volumes to which the server and the two clients have permissions to access. We assume that the logical volume vol1 can be accessed by the server, the client 1 and the client 2; the logical volume vol2 can be accessed by the server and the client 2; and the logical volume vol3 can be accessed by the server and the client 1. Then, the identified device description files are as follows:

Server: vol1=des_file1, vol2=des_file2, vol3=des_file3
Client 1: vol1=des_file4, vol3=des_file5
Client 2: vol1=des_file6, vol2=des_file7

Also, the three logical volumes have unique device identifiers, WWN1, WWN2 and WWN3, respectively.

Next, the corresponding relationship between the two sets of device description files established at the server is shown as FIG. 4B (the device description files of the server are the first set of device description files, and the device description files of the client 1 and client 2 are collectively referred to as the second set of device description files). It can be seen from FIG. 4B that a map of the same logical volume between the server and the clients is established through the unique device identifier WWN.

Further, in order to better show the technical solution of the present invention, the respective corresponding relationship tables can be optionally established at the two clients so as to make a unique identifier WWN of a logical volume accessible to the client correspond to the device description file of said logical volume with respect to the client. FIG. 4C shows a corresponding relationship table established at the first client according to an embodiment of the present invention. FIG. 4D shows a corresponding relationship table established at the second client according to an embodiment of the present invention.

Next, in accordance with the description of FIGS. 2 and 3, if a request for data transmission designating the logical volume Vol3 is received from the client 1, then the first set of device description file corresponding to the device description file des_file5 is searched in the corresponding relationship table (FIG. 4B) established at the server, and the searching result is des_file3. Then, it is judged whether the logical volume Vol3 indicated by des_file3 is currently available. Given that the judging result is yes, the server transmits a notification of confirmation to the client. Then, the client 1 can perform an operation of data access to the logical volume Vol3 over the SAN. In the specific process of the data access/transmission, the client 1 transmits an instruction of data transmission (the data quantity of the transmission of an instruction is very small) to the server over the LAN, and then performs the actual data transmission with the logical volume Vol3 over the SAN. Since the corresponding relationship has been established, the server can correctly identify which logical volume the client 1 desires to access after receiving the instruction from the client 1 so that the object is achieved that the storage area network (SAN) is used to transmit data in the magnetic disk storage environment, and no extra payload of hardware devices (including the magnetic tape and the distributed file system) is required.

Figure 5:
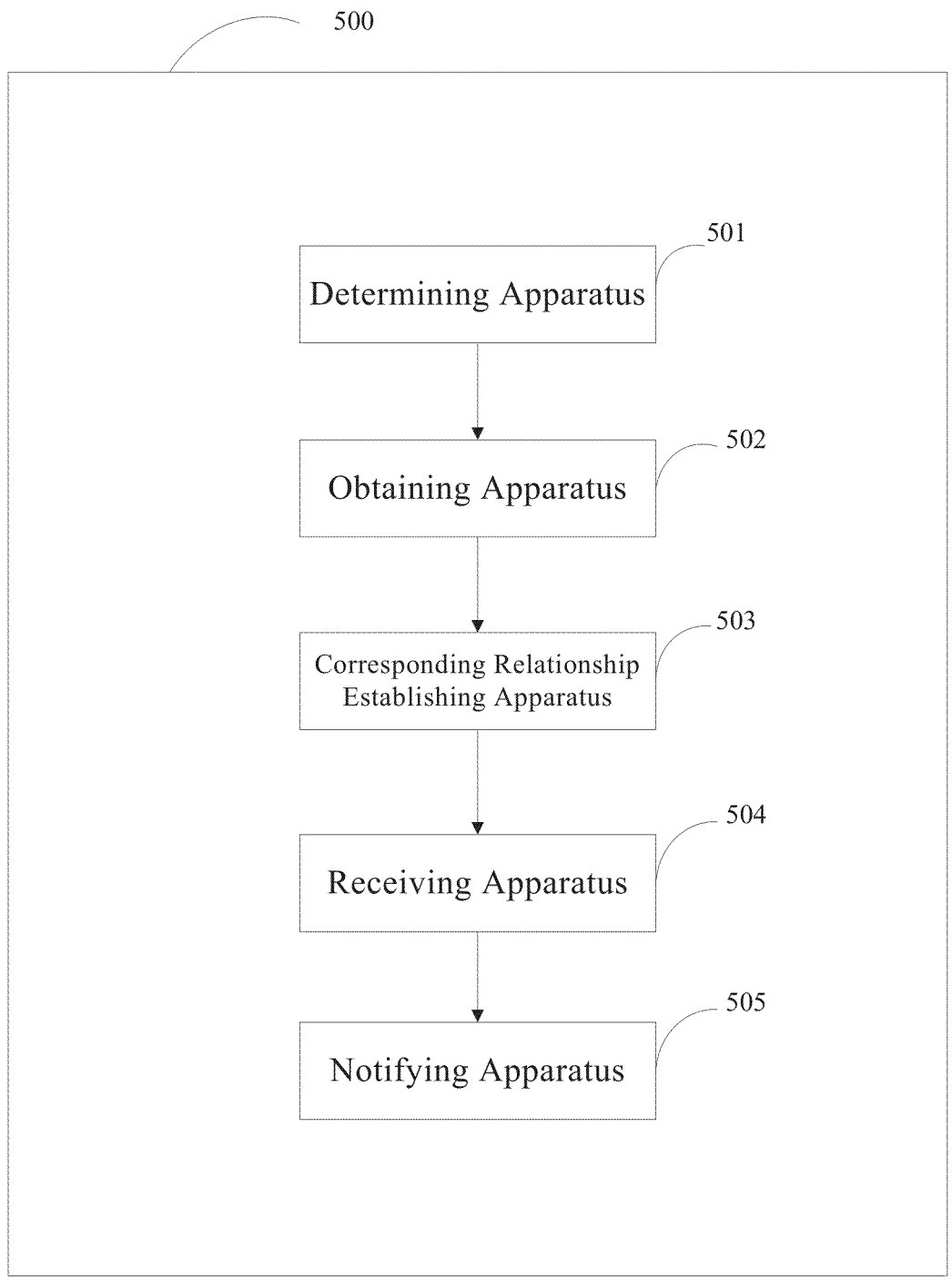
FIG. 5 shows a block diagram of a system for transmitting data over a storage area network (SAN) in a magnetic disk storage device environment according to an embodiment of the present invention.

FIG. 5 shows a block diagram of a system for transmitting data over a storage area network (SAN) in a magnetic disk storage device environment according to an embodiment of the present invention. The system shown in FIG. 5 is represented by the system 500 as a whole. Specifically, the system 500 includes a determining apparatus 501 configured to determine a logical volume accessible to a server of said magnetic disk storage device; an obtaining apparatus 502 configured to obtain information on a logical volume accessible to a client of the magnetic disk storage device, which is determined by said client; a corresponding relationship establishing apparatus 503 configured to establish a corresponding relationship between the logical volume accessible to the server and the logical volume accessible to the client; a receiving apparatus 504 configured to receive a request for using a logical volume of the magnetic disk storage device from the client; and a notifying apparatus 505 configured to inform the client of an available logical volume by utilizing the corresponding relationship, wherein a data access to the available logical volume is performed by the client over the SAN.

Those skilled in the art should understand that the apparatuses 501-505 in the system 500 shown in FIG. 5 correspond to steps 201-205 in the method shown in FIG. 2, respectively. Also, the apparatus 505 in the system 500 can be understood as corresponding to steps 305-312 in the method shown in FIG. 3. Herein, they will not be described redundantly.

Figure 6:
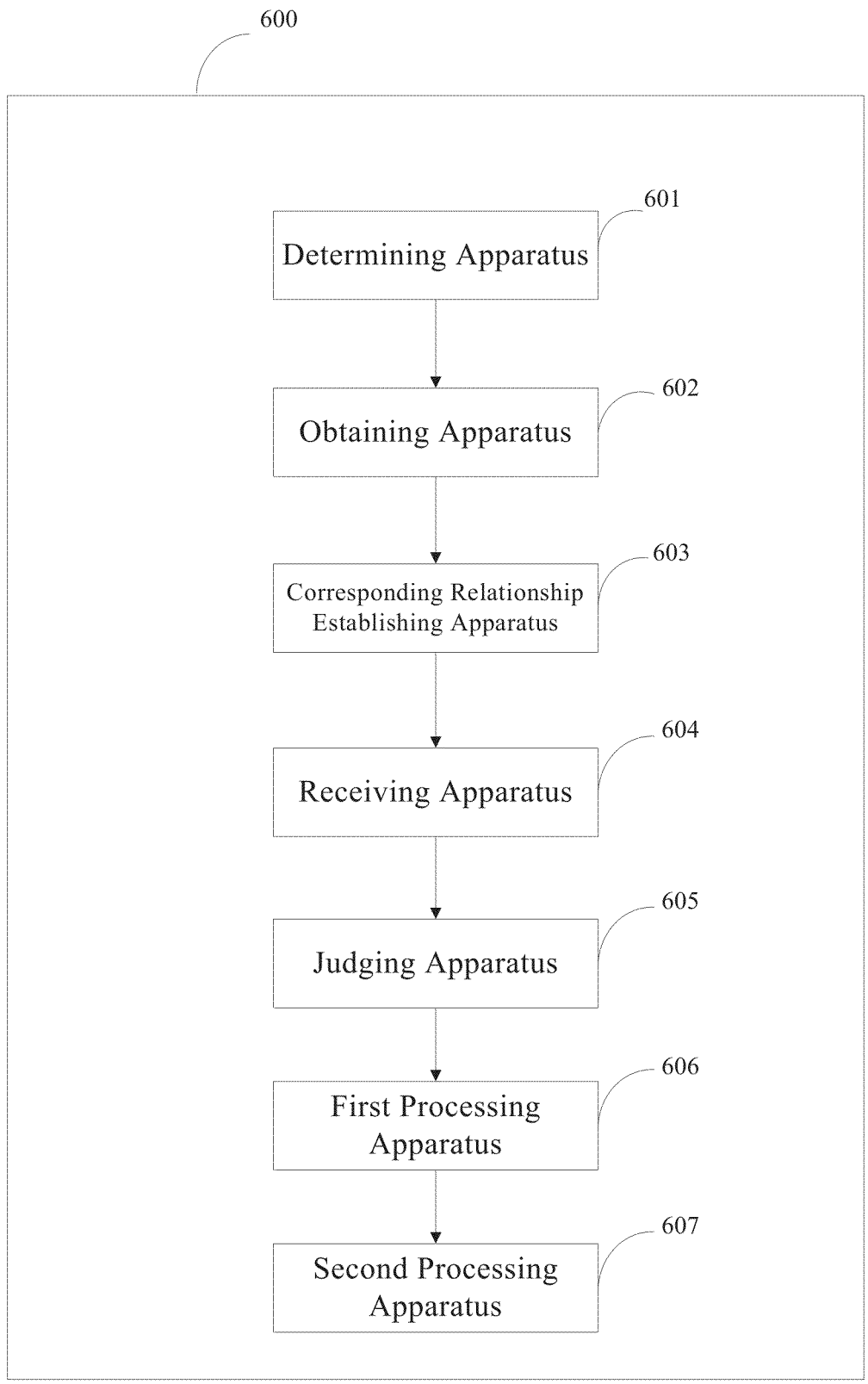
FIG. 6 shows a block diagram of a system for transmitting data over a storage area network (SAN) in a magnetic disk storage device environment according to an embodiment of the present invention.

FIG. 6 shows a block diagram of a system for transmitting data over a storage area network (SAN) in a magnetic disk storage device environment according to an embodiment of the present invention. The system shown in FIG. 6 is represented by the system 600 as a whole. Specifically, the system 600 includes: a determining apparatus 601 configured to determine a logical volume accessible to a server of the magnetic disk storage device; an obtaining apparatus 602 configured to obtain information on a logical volume accessible to a client of the magnetic disk storage device, which is determined by the client; a corresponding relationship establishing apparatus 603 configured to establish a corresponding relationship between the logical volume accessible to the server and the logical volume accessible to the client; a receiving apparatus 604 configured to receive a request for using a logical volume of the magnetic disk storage device from the client; a judging apparatus 605 configured to judge whether the received request from the client is a request designating a logical volume; a first processing apparatus 606 configured to select a logical volume available for the client from the logical volume accessible to the server in response that the received request is a request designating no specific logical volume, to search a second set of device description file corresponding to a first set of device description file of the selected logical volume by utilizing the corresponding relationship, and transmit the found second set of device description file of the selected logical volume to the client; and a second processing apparatus 607 configured to search a first set of device description file corresponding to a second set of device description file of a designated logical volume by utilizing the corresponding relationship in response that the received request is a request designating the logical volume, and inform the client of a currently available state in response that the logical volume indicated by the found first set of device description file is currently available.

Those skilled in the art should understand that the apparatuses 601-604 in the system 600 shown in FIG. 6 correspond to the apparatuses 501-504 in the system 500 shown in FIG. 5, and also to steps 201-204 in the method shown in FIG. 2, respectively. The judging apparatus 605, the first processing apparatus 606 and the second processing apparatus 607 in the system 600 as a whole correspond to the apparatus 505 in the system 500, wherein the first processing apparatus 606 can be understood as corresponding to steps 306-308 in the method shown in FIG. 3, and the second processing apparatus 607 can be understood as corresponding to steps 309-312 in the method shown in FIG. 3. Herein, they will not be described redundantly.

The flowcharts and block diagrams in the drawings illustrate the architecture, functionality and operation of possible implementations of systems, methods and computer program products according to various embodiments of the present invention. In this regard, each block in the flowcharts or block diagrams may represent a modular, program segment, or part of code, which comprises one or more executable instructions for implementing the specified logic function(s). It should also be noted that, in some alternative implementations, the functions noted in the block may also occur in an order other than that noted in the drawings. For example, two blocks consecutively shown may, in fact, be performed substantially in parallel, or sometimes they may be performed in a reverse order, depending upon the functionality involved. It will also be noted tha, each block of the block diagrams and/or flowcharts and combinations of blocks in the block diagrams and/or flowcharts can be implemented by using a special purpose hardware-based system that executes the specified functions or operations, or by using a combination of a special purpose hardware and computer instructions.

While the system and method for processing a local file by use of a remote application of the present invention is described in detail in conjunction with the particular examples, the present invention is not limited thereto. Those skilled in the art can make a variety of changes, substitutions and modifications under the teachings of the specification without departing from the spirit and scope of the present invention. It should be understood that all such changes, substitutions and modifications still fall into the protection scope of the present invention. The protection scope of the present invention is defined by the appended claims.

What is claimed is:

1. A method for transmitting data over a storage area network (SAN) in a disk storage device environment, comprising:
    determining a logical volume accessible to a server of said disk storage device environment;
    obtaining information on a logical volume accessible to a client of said disk storage device environment, wherein the logical volume accessible to a client of said disk storage device environment is determined by said client;
    establishing a corresponding relationship between said logical volume accessible to said server and said logical volume accessible to said client;
    receiving a request for using said logical volume of said disk storage device environment from the client; and
    informing said client of an available logical volume by utilizing said corresponding relationship so that a data access to said available logical volume is performed by said client over said SAN, wherein information on the logical volume accessible to the server is shareable with the client such that the client does not need to maintain its own separate copy of the information.

2. The method according to claim 1, wherein determining a logical volume accessible to the server of said disk storage device environment comprises determining a first set of device description file of the logical volume accessible to the server of said disk storage device environment and a unique identifier of said logical volume accessible to the server, and wherein the obtained information on the logical volume accessible to said client includes a second set of device description file of the logical volume accessible to said client and a unique identifier of the logical volume accessible to said client.

3. The method according to claim 2, wherein establishing a corresponding relationship between said logical volume accessible to the server and said logical volume accessible to the client comprises:
    establishing a corresponding relationship between different device description files having a same WWN identifier and belonging to the first set of description file and the second set of description file respectively.

4. The method according to claim 2, wherein informing said client of an available logical volume by utilizing said corresponding relationship comprises:
    selecting a logical volume available for the client from said logical volume accessible to the server in response that the received request is a request designating no specific logical volume;
    searching the second set of device description file corresponding to the first set of device description file of the selected logical volume by utilizing said corresponding relationship; and
    transmitting the found second set of device description file of the selected logical volume to said client.

5. The method according to claim 4, wherein selecting the logical volume available for the client from said logical volume accessible to the server in response that said request for using is a request designating no specific logical volume comprises:
    randomly selecting a logical volume from the logical volume accessible to the server;
    first judging whether said client has a permission to access said randomly selected logical volume;
    second judging whether said logical volume which the client has the permission to access is currently available if the first judging result is yes; and
    determining said logical volume which the client has the permission to access and which is currently available as the logical volume accessible to the client if the second judging result is yes.

6. The method according to claim 2, wherein informing said client of an available logical volume by utilizing said corresponding relationship comprises:
    searching the first set of device description file corresponding to the second set of device description file of a designated logical volume by utilizing said corresponding relationship in response that the received request is a request designating the logical volume; and
    informing said client of said currently available state in response that the logical volume indicated by the found first set of device description file is currently available.

7. The method according to claim 1, wherein determining a logical volume accessible to a server of said disk storage device environment is achieved by scanning a host bus adapter (HBA).

8. The method according to claim 1, wherein a notification about an available logical volume for data access to be performed by said client over the SAN is transmitted to said client over a local area network (LAN).

9. The method according to claim 1, wherein the logical volume accessible to the server comprises a plurality of file blocks dispersed on at least one physical storage volume and organized as the logical volume accessible to the server, and wherein multiple ones of the logical volume accessible to the server are dispersed on the at least one physical storage volume.

10. The method according to claim 1, wherein the logical volume accessible to the server and the logical volume accessible to the client are the same logical volume that is identified by different device descriptor files by the server and client, respectively.

* * * * *